United States Patent
Dullien

[11] Patent Number: 6,007,593
[45] Date of Patent: Dec. 28, 1999

[54] DEVICE FOR AGGLOMERATING AND PRECIPITATING PARTICLES IN A GAS STREAM

[75] Inventor: Francis A. L. Dullien, Kitchener, Canada

[73] Assignees: Dullien, Francis A.L., Ontario, Canada; Institut Francais Du Petrole, Rueil-Malmaison, France

[21] Appl. No.: 08/930,282

[22] PCT Filed: Jan. 28, 1997

[86] PCT No.: PCT/FR97/00164

§ 371 Date: Sep. 30, 1997

§ 102(e) Date: Sep. 30, 1997

[87] PCT Pub. No.: WO97/27928

PCT Pub. Date: Aug. 7, 1997

[30] Foreign Application Priority Data

Jan. 31, 1996 [CA] Canada .................................... 2168486

[51] Int. Cl.$^6$ ............................ B01D 46/12; B01D 45/08
[52] U.S. Cl. ................................ 55/323; 55/325; 55/423; 55/428; 55/432; 55/DIG. 25
[58] Field of Search ............................. 55/320, 315, 323, 55/325, 342, 343, 350.1, 482, 485, 442, 440, 443, 444, 445, DIG. 25, 423, 428, 432; 95/287, 288, 268

[56] References Cited

U.S. PATENT DOCUMENTS

| | | | |
|---|---|---|---|
| 165,141 | 6/1875 | White | 95/287 |
| 416,889 | 12/1889 | Barnard | 55/325 |
| 1,708,653 | 4/1929 | Boyrie | 55/342 |
| 1,966,280 | 7/1934 | Bingam | 55/440 |
| 2,673,620 | 3/1954 | Montgomery | 55/485 |
| 2,976,954 | 3/1961 | Irwin | 55/442 |
| 3,813,855 | 7/1974 | Hill et al. | 55/440 |
| 4,950,313 | 8/1990 | Dullien et al. | 55/485 |
| 5,626,651 | 5/1997 | Dullien | 95/268 |

FOREIGN PATENT DOCUMENTS

| | | |
|---|---|---|
| 280160 | 2/1988 | European Pat. Off. . |
| 627251 | 12/1994 | European Pat. Off. . |
| 2931702 | 2/1981 | Germany . |
| 2012611 | 8/1979 | United Kingdom . |
| 86/03252 | 6/1986 | WIPO . |
| 94/20195 | 9/1994 | WIPO . |
| 95/28217 | 10/1995 | WIPO . |

Primary Examiner—Duane S. Smith
Attorney, Agent, or Firm—Antonelli, Terry, Stout & Kraus, LLP

[57] ABSTRACT

An agglomeration and precipitation assembly which includes an agglomeration device in combination with a precipitation device. The agglomeration device is intended to receive a turbulent gas stream containing fine suspended particles and to discharge the stream in which the major part of the fine particles have agglomerated in the form of larger particles. The precipitation device is provided downstream of the agglomeration device to receive the stream coming from the agglomeration device and to separate the larger particles from the gas stream. The fine particles can be separated from a turbulent gas stream by first agglomerating the fine particles in the form of larger particles, and then separating the larger particles by precipitation.

9 Claims, 2 Drawing Sheets

DEVICE FOR AGGLOMERATING AND PRECIPITATING PARTICLES IN A GAS STREAM

FIELD OF THE INVENTION

The present invention relates to improvements carried out to particle precipitation devices and to particle agglomeration devices intended for use with particle precipitation devices, and to the combination of a particle agglomeration device and of a particle precipitation device. The invention relates both to the device and to the method implemented.

BACKGROUND OF THE INVENTION

American patent applications Ser. Nos. 08/290,883 now abandoned and 08/406,393, now abandoned the second being partly the sequel to the first one, filed on Aug. 18, 1994 and Mar. 20, 1995 (see also British patent No. 2,264,655 B published on May 24, 1995, British patent application No. 94/07,441.6 filed on Apr. 14, 1994, published international patent application WO 93/15,822 and international patent application WO 95/00,489) respectively disclose a certain number of forms of particle precipitation devices intended for separation of particles carried along in a turbulent gas stream (generally, but not necessarily, air). Reference is made to these documents in the description hereafter. The particles can be solid or liquid.

In the specific description hereunder, one of the aspects of the present invention is notably explained for separation of an oil fog contained in a turbulent air stream, i.e. ultra-fine suspended oil particles, typically droplets of a size below 0.5 micron. Such oil-laden air streams are encountered in the form of emissions of industrial machines working at high speeds.

However, it can be noted that this example of the present invention relative to the separation of oil droplets contained in an air stream is not limitative within the scope of the present invention since the invention also applies to the separation (precipitation) of other suspended liquid or solid particles, for example dust, vapour or smoke. Such a separation can be performed by one of the precipitation devices disclosed in the aforementioned patent applications and patent, by the variant of the previously disclosed precipitation devices described in the present document or by any other form of precipitation device such as an electrostatic precipitation device capable of performing the desired separation of particles contained in a gas stream.

It has been discovered that the efficiency of a particle precipitation device is substantially higher if the particles have a certain minimum size. Separation of particles with a size below one micron by means of a precipitation device is less effective or may require a costlier equipment. For example, a suitable separation of particles having a size below one micron can require a multi-stage precipitation device or a precipitation device of a disproportionate length, which will lead to an unsatisfactory result or require setting of an excessively costly equipment.

One of the objects of the present invention is to avoid these difficulties by proposing a method and a device intended to increase the size of the particles contained in the gas stream before they enter the precipitation device.

This objective is reached through agglomeration of the particles prior to their entering the precipitation device. Although the agglomeration technique described here is particularly effective when the particles initially occur in the form of a fog, it is also applicable to particles exhibiting the form of dust, vapour or smoke. Furthermore, this technique is not limited to particles whose initial size is below one micron. Nearly any size increase of the particles entering the precipitation device is advantageous. Therefore, when it is said here that this technique is aimed at agglomeration of "fine" particles, all the particles that are too small to be subjected to a fast and effective separation in a precipitation device, including the ultra-fine particles present in a fog, should also be included therein.

SUMMARY OF THE INVENTION

The present invention can thus be partly defined as a method of separating fine particles from a turbulent gas stream during which said fine particles are first agglomerated in the form of larger particles, then said larger particles are separated from the gas stream by precipitation.

The aglomeration stage can consist of a method of agglomerating fine particles suspended in a turbulent gas stream wherein the gas stream is passed successively through a series of filters so as to cause some of said particles to collide with the solid parts of each of the filters in order that they agglomerate in the form of larger particles. A large part of these larger particles is re-entrained in the gas stream while part thereof falls from the filters prior to being collected.

Preferably, the stream is passed successively through at least ten filters or through at least thirty filters.

The stream with the re-entrained larger particles is advantageously passed into a particle precipitation device.

According to one of the aspects thereof, the invention can be defined as the combination of (a) an agglomeration device intended to receive a turbulent gas stream containing fine suspended particles and to discharge the stream in which the major part of said fine particles has agglomerated in the form of larger particles and of (b) a precipitation device intended to receive the gas stream leaving the agglomeration device and to separate the larger particles from the gas stream.

The agglomeration device used in this combination can comprise a pipe provided with an opening intended to receive the gas stream and with an outlet intended for discharge of the stream, as well as a series of filters placed substantially parallel in the pipe and spaced out along the pipe between the inlet and the outlet, each filter extending across the pipe generally crosswise with respect to the gas stream, so that all of the stream flows substantially through all the filters successively, each filter comprising solid parts distributed along the pipe and intended to be collided by a certain number of said particles, as well as holes distributed along the pipe in order to allow passage of the stream.

The agglomeration device can also comprise means intended for discharge of the agglomerated particles that are not re-entrained in the gas stream and fall onto the bottom of the plant.

According to the invention, the solid parts of each filter occupy a surface area that is less than the major part of the section of the pipe.

According to an embodiment of the invention, each filter comprises sets of parallel strands separated from one another and extending crosswise in relation to one another so as to form a meshed structure, these strands forming said solid parts, and spaces between the strands forming said holes; the ratio of the distance between the strands to the thickness of the strands approximately ranges between ten and five.

According to another embodiment of the invention, each filter comprises a plate provided with holes.

Besides, the spacing of the filters with respect to one another in the direction of flow of the stream must not be less than about five millimeters.

According to another embodiment of the invention, the filters consist of a continuous meshed material extending successively over transverse rods situated in the upper part and in the lower part of the pipe.

The precipitation device according to the invention can have the form of any one of the devices described in the aforementioned patent applications and patent; it may also be another precipitation device capable of separating particles from a gas stream.

The precipitation device can thus comprise at least one non-obstructed channel intended to convey the turbulent stream, and a series of objects extending along, it least one side of each channel, said objects being positioned at close intervals in the direction of flow so as to define with each other spaces which swirls coming from each channel enter, which leads to the accumulation of particles on the surface of said objects after the swirls have declined. According to an aspect of the present invention, the objects on whose surface the particles accumulate consist of at least one corrugated plate.

The folds of each of said corrugated plates have a depth that is greater than the pitch between the folds.

Said depth is thus approximately four times as great as said pitch.

Preferably, each of said corrugated plates is positioned substantially vertically so as to allow the particles accumulated on the surface thereof to fall to the bottom of a casing containing said plate(s) and defining thus said channel(s).

The bottom of the casing is thus inclined to the horizontal in order to favour the flow of the particles fallen from the surface of the corrugated plate(s) towards an end of said bottom, then into an external collector.

The particles can be liquid and the external collector then comprises a liquid trap.

The particles can be solid and the external collector then comprises a hopper.

The precipitation device can also comprise a cup extending over the bottom of the casing and which contains the lower parts of said corrugated plates, characterized in that a small free space is provided between the lower ends of said corrugated plates and the bottom of the casing in order to collect the solid particles fallen from the surface of the plates and to guide them below said corrugated plates through an opening provided in the cup so as to drive them towards a particle discharge slot situated at the end of the casing bottom.

A vibrator intended to favour transfer of the solid particles to the external collector can be provided.

DESCRIPTION OF THE PREFERRED EMBODIMENTS

Figure 1:
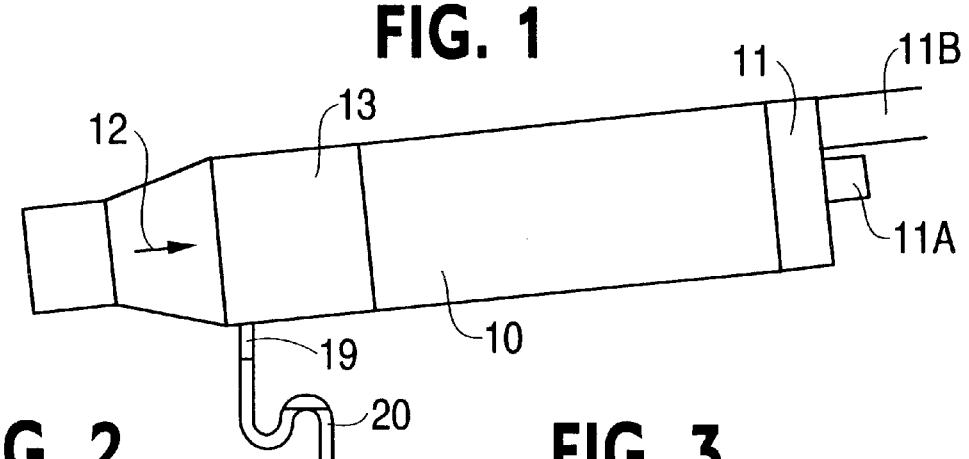
FIG. 1 is a general view of the layout of an agglomeration device and of a precipitation device according to the invention.
Figure 2:
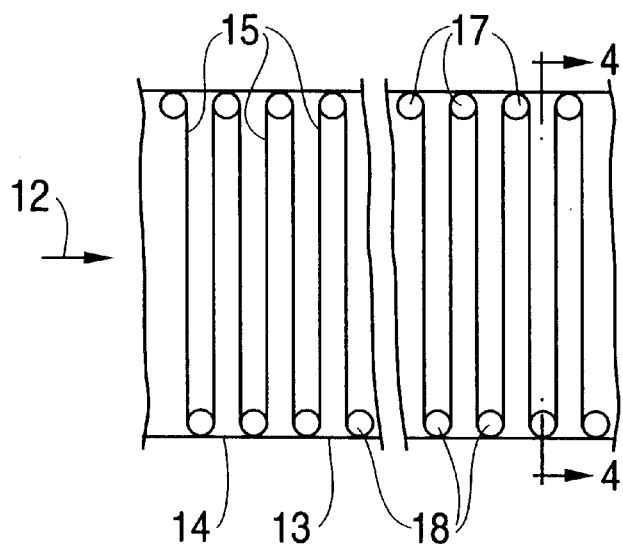
FIG. 2 is a fragmentary cutaway side view of an agglomeration device according to an embodiment of the present invention.

The particle precipitation device 10 shown in FIGS. 1 and 2 can be any one of the precipitation devices described in the aforementioned patent or patent applications, and it can be more particularly one of those presented in American patent application Ser No. 08/406,393 or the variant thereof described hereunder in connection with FIGS. 5 to 8. It can also be any precipitation device capable of separating solid or liquid particles from a turbulent air stream 12 drawn into the system by a fan 11 or by any other means. The fan comprises a motor 11A and an outlet 11B.

According to the invention, an agglomeration device 13 is situated upstream from precipitation device 10 in relation to the direction of flow of the gas. The purpose of device 13 is to increase the size of the particles carried along, or suspended in air stream 12 so that the collecting surfaces of precipitation device 10 can separate them more effectively from the stream.

The system presented in FIG. 1 was designed to separate liquid particles from a gas stream, a fog for example, which is the reason why it is inclined to the horizontal and provided with a liquid trap 20. The liquid accumulated in the system (mainly, but not exclusively, at the bottom of precipitation device 10) flows out at the bottom of precipitation device 10 and of agglomeration device 13, enters a drain 19 and finally a trap 20 serving as an external liquid collector while preventing the air from being drawn into the system in this place. Typical liquid levels in drain 19 and in trap 20 are shown in FIG. 1.

Figure 6:
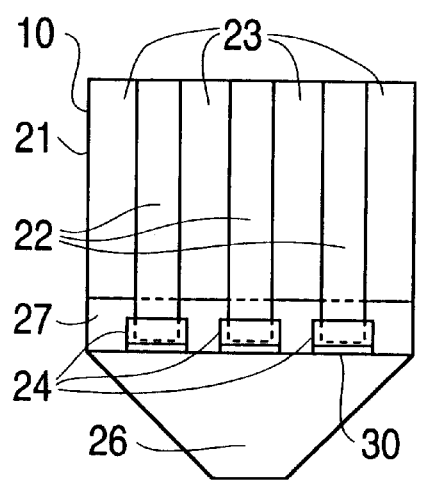
FIG. 6 is a cutaway side elevation of the precipitation device of FIG 5.
Figure 7:
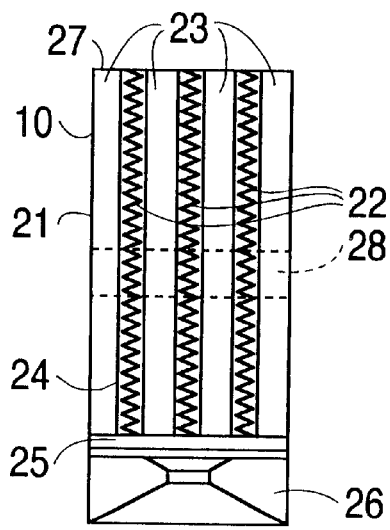
FIG. 7 is a cutaway bottom view of the precipitation device of FIG. 5 and 6.
Figure 8:
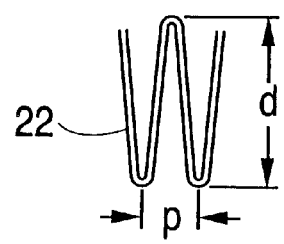
FIG. 8 is an enlarged fragment of a collecting element in the precipitation device according to FIGS. 5, 6 or 7.

When the system is designed for separation of solid particles, dust for examples the latter characteristics are modified, as described hereunder in connection with FIGS. 6 and 7.

Figure 3:
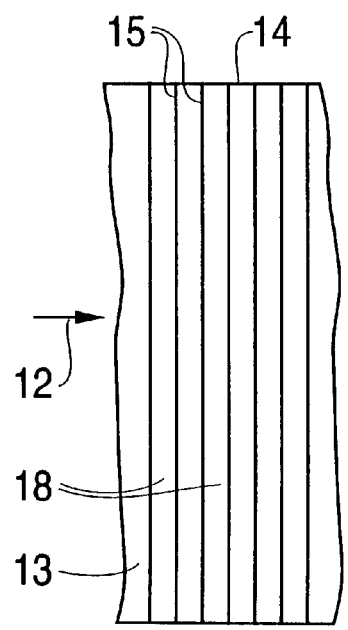
FIG. 3 is a fragmentary cutaway top view of a part of the agglomeration device of FIG. 2.

As may be seen in FIGS. 2 and 3, agglomeration device 13 can consist of a tubular pipe 14 of rectangular section (in a specific example, 34 cm long, 46 cm wide and 30 cm high) forming a tunnel between an opening connected to the gas stream inlet and an outlet connected to precipitation device 10. A series of filters 15 spaced out with respect to one another is placed in this pipe 14, each of these filters extending fully across the pipe in the two directions perpendicular to air stream 12 so that, theoretically, all of the air stream must flow successively through all the filters 15. In practice, a small amount of the stream can bypass said filters.

Figure 4:
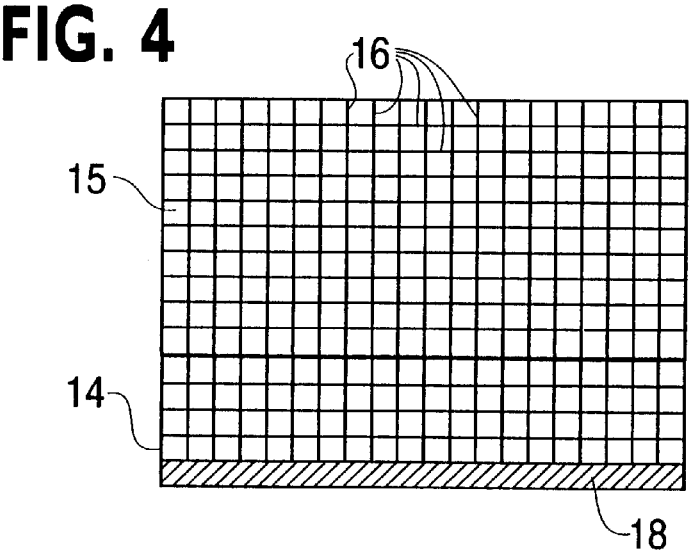
FIG. 4 is a view along the line 4—4 of FIG. 2.

As shown in FIG. 4, which is not true to scale, a typical filter 15 consists of two sets of transverse strands 16 forming a meshed network; these strands can be made of a suitable material such as polyester, glass fiber or metal. In a typical example, each strand 16 is approximately 1 mm thick, the spacing of the strands being of the order of 5 mm. A suitable method of forming this assembly when filters 15 are made of a flexible material consists in using a very long strip of this material and in passing it successively over the lower 17 and upper 18 rods that extend across pipe 14. The diameter of these rods will determine the spacing of filters 15 which can approximately range between 5 mm and 1 cm. If the filters are much closer to one another, they will not fulfil their purpose fully, as described hereunder, because they will not totally work as separate filters. If they are more spaced out, although they will work effectively, a device of disproportionate length will be obtained.

Figure 4A:
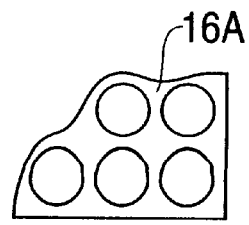
FIG. 4A is a fragmentary view of a variant of FIG. 4.

When the turbulent air stream 12 that is assumed to convey oil fog particles of a size below one micron enters the inlet port of agglomeration device 13, it has been experimentally discovered that a small part of these particles separates off from the portions of the air stream flowing on each side of each strand 16, the particles thus separated colliding directly with the strands. On each filter 15, only a small fraction of the incoming fog particles collides with the strands, since most of the particles flow freely with the air stream through the holes between the strands. If one considers that a fraction (y) of the incoming fog particles collides with the solid parts (strands) of the first filter, the remaining fraction $(1-y)$ will flow through the holes. The fog particles that have flowed through the holes with the air stream will be mixed because of the turbulent flow and will have a substantially uniform distribution before they reach the second filter. Furthermore, if need be, the strands can be positioned in staggered rows between adjacent filters in order to guarantee the presence of strands directly on the route of the particles that have flowed through the holes of the previous filter, with the air stream. When reaching the second filter, the same fraction (y) of the remaining fraction $(1-y)$ will collide with the strands. The remaining fraction (transmitted through the holes) after the second filter is thus $(1-y)-y(1-y)\ (1y)=(1-y)^2$. After flowing through n filters, the fraction of the initial oil fog particles remaining in the air stream will be $(1-y)n$. 0.04 is a typical value for y, i.e. 4%. If n=60, for example, the fraction of particles remaininig after the stream has flowed through the last filter of the series will be 0.96 to the power 60, which approximately corresponds to 0.09. A fraction of about 9% of the initial fog particles will thus remain in the air stream leaving the agglomeration device, whereas about 91% have collided with one or the other filter.

After impact, most of the substances forming the particles that have collided with the filters tend to be re-entrained in the air stream. However, it has been observed that these re-entrained substances consisted of new particles, larger than the initial particles. In other words, the initial fine particles have agglomerated to give larger particles. Some of these agglomerated particles remain in the agglomeration device and fall to the bottom of the plant, thus forming a liquid that flows into trap 20 and thus joins all of the particles that have been collected. To obtain this result, it is important that the gas stream flowing through the agglomeration device exhibits a turbulent flow.

Within the scope of an experiment carried out with an oil fog produced by a sprayer, It has been measured that the size of about 80% by weight of the fog particles entering the agglomeration device was below 0.5 micron. When this fog flowed directly into a 1-meter long precipitation device (when the agglomeration device had been removed), only 40% by weight of the particles were separated give the air stream. However, when the agglomeration device was situated between the incoming fog and the same precipitation device, the latter separated approximately 93% by weight of the fog particles contained in the air stream. This performance (93% recovery) could have been theoretically obtained with a precipitation device alone (without an agglomeration device) if the length of the precipitation device had been extended to five meters. Whereas the agglomeration device used alone only allows to collect a poor amount of particles of a size below one micron, the synergism of the phenomena occurring within the associated agglomeration and precipitation devices allows to obtain a method providing the high performances required for separation of fine particles without requiring implementation of a longer precipitation device.

In order to demonstrate this synergism, it is assumed that particle agglomeration device 13 collects the oil fog with an overall fractional efficiency (a) and that the precipitation device collects the same fog with an overall fractional efficiency (b). In the absence of synergism, the fractional efficiency E of the combined agglomeration device+precipitation device system would be $E=1-(1-a)\ (1-b)$. As we have seen, the real fractional efficiency E' of the combined agglomeration device+precipitation device system is considerably greater than E, i.e. $E' \gg E$. This does not only show the existence of a synergism, but it also shows the physical cause thereof, i.e. the fog flowing from the agglomeration device and entering the precipitation device is not the same fog as the one which entered the agglomeration device; it is a fog made up of particles of a considerably larger size, which is collected by the precipitation device with a much higher fractional efficiency $b' > b$ than the one that might have been observed for the initial fog. Thus, $1-(1-a)\ (1-b') \gg 1-(1-a)\ (1-b)$. It has been determined that 80% by weight of the initial fog particles have a size below 0.5 micron, whereas the particles that constitute the fog flowing out of the agglomeration device have an average size of about 4 microns. The measured efficiencies are the following: $E'=0.93$, $b'=0.9$, $b=0.4$ and $a=0.3$, whence $E=0.58$. It is therefore obvious that $E' \gg E$.

In the aforementioned mathematical examples, it was assumed that 60 filters were used, 57 filters having actually been used during the experiment described above. Selection of the number of filters will be a compromise between an improvement in the performances (more filters) and in economy (less filters). In cases where a certain decrease in performances is allowable, or if the incoming particles have a size above one micron while being fine particles in the sense that they are too small to be separated directly in the precipitation device, it is possible to use a more limited number of filters. Normally, this number will preferably not be below 30, but it can be brought down to 10, or even less, when lower performances are allowable or when the value of y can be increased, or else when the device must perform separation of a fog containing droplets of a substantially larger size from the beginning. There may thus be circumstances where a relatively limited number of filters can be effective. There is no maximum number, although a number above 100 would normally not be very profitable in relation to the advantage that would be gained therefrom. Preferably, the number of filters will thus normally range between 30 and 80.

Although each filter 15 has been described so far in the form of a meshed structure consisting of strands perpendicular with respect to each other, it is also possible to use another structure such as a perforated plate producing the same effect, i.e. providing a large number of solid parts intended to be collided by certain particles, while leaving spaces intended to allow passage of the, as stream and of the remaining particles carried along. FIG. 4A illustrates part of such a plate. Although implementation of a perforated plate may lead to an increase in the head loss undergone by the gas stream, it can also favour an increase of the value of y and thus allow to reduce the number of filters required, which would have a positive effect on the head loss.

It should be noted that the term "filter" used in the claims hereafter applies not only to meshed structures, but also to non-meshed structures such as the perforated plate 16A shown in FIG. 4A, provided that the latter fulfils a similar function by being provided with a surface on which solid parts collided by the particles and free spaces allowing passage of the gas stream are distributed. In order to minimize head losses, the surface area consisting of solid parts will normally represent less than 50% of the total section of the pipe.

Several long-time tests have been carried out with an oil for. After the tests were completed, it has been observed that the filters of the agglomeration device and the particle collecting elements in the precipitation device were impregnated with oil. The flow rate was 1000 m³ per hour and the velocity of the air stream was seven meters per second. A very satisfactory separation of the oil droplets was observed, as well as an allowable head loss of only five centimeters of water column.

The filters are preferably positioned vertically, the gas stream flowing horizontally. However, these conditions are not rigid and it is possible to deviate therefrom while allowing effective operation of the agglomeration device. The inclination of the system allowing the particles collected in trap 20 to flow out will not exhibit a totally horizontal positioning and, as mentioned below, the degree of inclination can be increased, for example to 15°, when solid particles are to be collected. There would normally be no advantage in changing the orientation of the flow of a gas stream, which is generally horizontal, and that of the filters, which are generally positioned vertically.

FIGS. 5 to 8 show details of the parts of the precipitation device that have been modified in relation to the constructions described in the aforementioned patent and patent applications. However, the theory on which the particle separation performances of the variant shown in FIGS. 5 to 8 are based basically remains the same as that applied in this patent and in these applications.

In FIGS. 5 to 8, precipitation device 10 is provided with a casing 21 forming a tunnel extending from an opening receiving the gas stream flowing from the agglomeration device or coming directly from an inlet port, if the use of an agglomeration device is not necessary on account of the relatively large size of the particles carried along to an outlet connected to fan (11).

In order to give the most exhaustive possible description, the precipitation device is shown in FIGS. 5 to 8 in the form of a device intended for separation of solid particles, without an associated agglomeration device 13. The basic principle of the construction can nevertheless also be applied to the separation of liquid particles, provided that a suitable liquid recovery system such as the discharge channels and trap 20 is associated therewith as a substitute for the dust recovery system shown in FIGS. 5 to 8.

Figure 5:
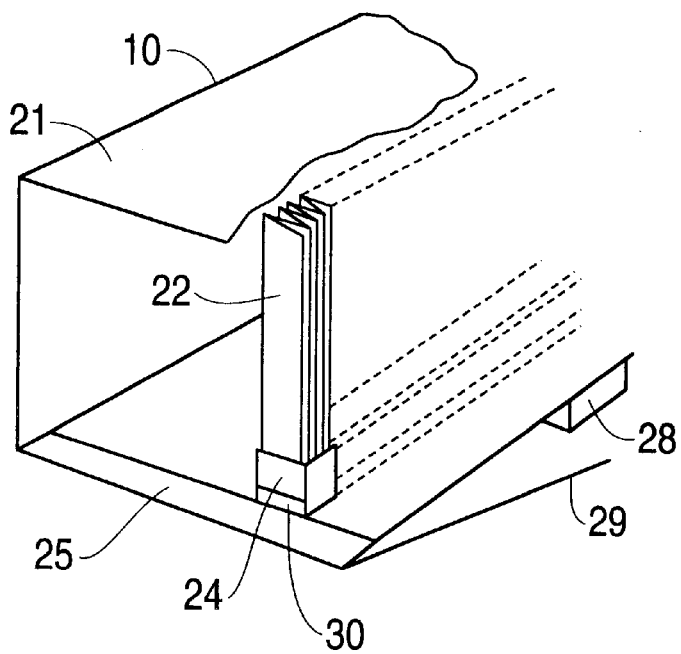
FIG. 5 is a fragmentary cutaway perspective view of a precipitation device according, to another embodiment of the invention.

The collecting elements extending along casing 21 exhibit the shape of corrugated plates 22, preferably made of metal. Corrugated plates 22 extend from the upper part of casing 21 to the vicinity of the lower part of the casing, thus leaving a free space allowing passage of the collected dust through an opening 30 and a slot 25 prior to entering a storage hopper 26. Only a first corrugated plate 22 is shown in FIG. 5 for clarity reasons. In practice there will be a plurality of such plates positioned side by side, for example the three shown in FIGS. 6 and 7, placed in casing 21 and spaced out with respect to one another so as to form channels 23 allowing passage of the gas stream positioned between adjacent plates and between the plates and the casing. As this embodiment of the invention is designed for dust recovery and since dust does not flow as easily as a liquid, casing 21 has a greater inclination of at least 15° for example to the horizontal 29, and it is connected to a vibrator 28 which causes the dust to fall onto the bottom. When the dust collected by corrugated plates 22 falls to the bottom of casing 21, part thereof might tend to disperse in the open channels 23 if it was not held back and it would be re-entrained in the gas stream. To prevent this, the lower parts of plates 22 are enclosed within cups 24. At the lower end (inlet) of casing 21, these cups 24 are provided with an opening 30 communicating with a slot 25 that extends across the bottom of the casing and communicates with a hopper 26 (not no shown in FIG. 5 for clarity reasons) which serves as an external collector intended for dust recovery and transportation. When an agglomeration device is used, the latter can be advantageously housed in the same casing 91 or in a casing having the same section as casing 21, as in the case of the recovery of a fog shown in FIG. 1. In this case, the inlet of the agglomeration device comprises a slot 25 rather than a dust discharge port. For dust recovery, a free space is also provided between the filters and the bottom of the agglomeration device. A deflector 27 is provided at the upper end (outlet) of casing 21 in order to cause the gas stream to leave the casing at a level situated above the bottom and therefore to minimize any tendency towards re-entrainment of the dust fallen to the bottom.

In order to minimize re-entrainment of dust particles separated from the gas stream by the corrugated plates, but which have not fallen into the cups yet, the folds of plates 22 must be close-spaced, i.e. form angles of low value. In other words, the depth of each fold in the direction d (FIG. 8) must be substantially greater than the pitch p. A d/p ratio of the order of four would be suitable. Although this ratio may be changed according to circumstances, it will be maintained at a value substantially greater than one in order to obtain the best possible performances.

To sum up, the performances of a precipitation device intended for separation of liquid or solid particles suspended in a gas stream are improved, when the particles are fine or ultra-fine, for example below one micron, by processing the gas stream before it enters the precipitation device with a view to the agglomeration of the fine particles in the form of particles of a larger size. This result is obtained by passing the gas stream successively through a series of filters. Some particles carried along in the gas stream collide with the solid parts of each filter and agglomerate during the process. A large part of the agglomerated particles is then re-entrained in the gas stream and flows through the precipitation device. As only a low percentage of particles collides with each filter, it is generally preferred to use a relatively large number of filters, for example at least 30. An improved embodiment of the precipitation device uses corrugated plates forming the surfaces on which the particles accumulate.

I claim:

1. An agglomeration and precipitation device comprising in combination:
   (a) an agglomeration device intended to receive a turbulent gas stream containing fine suspended particles and to discharge the stream in which the major part of said find particles has agglomerated in the form of larger particles, and
   (b) a precipitation device provided downstream of the agglomeration device to receive the stream coming from the agglomeration device and to separate the larger particles from the gas stream, wherein said precipitation device comprises at least one non-obstructed channel intended to convey the stream exhibiting a turbulent flow and a series of objects extending along at least one side of each channel, said objects being positioned at close intervals in the direction of flow so as to define with each other spaces which swirls coming from each channel enter, which leads to an accumulation of particles at the surface of said objects after the swirl have declined, wherein said objects consist of at least one corrugated plate.

2. An agglomeration and precipitation device as claimed in claim 1, wherein the folds of each of said at least one corrugated plate have a depth that is greater than the pitch between the folds.

3. An agglomeration and precipitation device as claimed in claim 1, wherein said depth is approximately four times as great a said pitch.

4. An agglomeration and precipitation device as claimed in claim 1, wherein each of said at least one corrugated plate is positioned substantially vertically so as to allow the particles accumulated at the surface thereof to fall to the bottom of a casing containing said plate(s) and thus defining said channel(s).

5. An agglomeration and precipitation device as claimed in claim 4, wherein the bottom of the casing is inclined to the horizontal in order to favor the flow of the particles fallen from the surface of the corrugated plate(s) towards an end of said bottom, then into an external collector.

6. An agglomeration and precipitation device as claimed in claim 5, wherein said particles are liquid and said external collector comprises a liquid trap.

7. An agglomeration and precipitation device as claimed in claim 5, wherein said particles are solid and said external collector comprises a hopper.

8. An agglomeration and precipitation device as claimed in claim 7. comprising a cup which extends along the bottom of the casing and which contains the lower parts of said corrugated plates, wherein a small free space is provided between the lower ends of said corrugated plates and the bottom of the casing in order to collect the solid particles fallen from the surface of the plates and to guide them below said corrugated plates through an opening provided in the cup so as to drive them towards a particle discharge slot situated at the end of the casing bottom.

9. An agglomeration and precipitation device as claimed in claim 8, comprising a vibrator intended to favor transfer of the solid particles towards the external collector.

* * * * *